Figure 2:
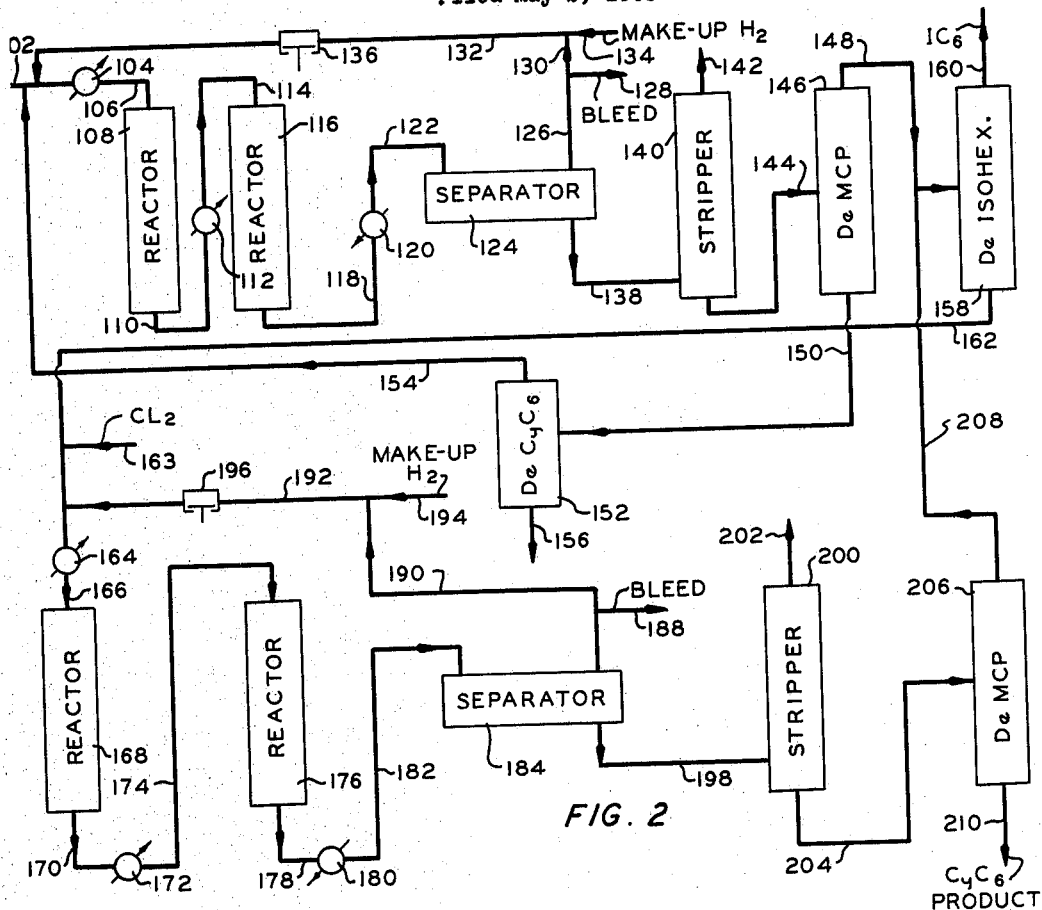

July 12, 1966  J. T. CABBAGE  3,260,762

ISOMERIZATION PROCESS

Filed May 2, 1963

INVENTOR.
J. T. CABBAGE

BY *Young and Quigg*

ATTORNEYS

United States Patent Office 3,260,762
Patented July 12, 1966

3,260,762
ISOMERIZATION PROCESS
John T. Cabbage, Bartlesville, Okla., assignor to Phillips Petroleum Company, a corporation of Delaware
Filed May 2, 1963, Ser. No. 277,635
6 Claims. (Cl. 260—666)

This invention relates to an improved process for the isomerization of $C_6$ hydrocarbons. In one aspect the invention relates to a method for the production of high-purity cyclohexane. In another aspect the invention relates to a process for the isomerization of cyclohexane to methylcyclopentane and the subsequent isomerization of the methylcyclopentane to high-purity cyclohexane.

Naturally occurring cyclohexane hydrocarbon fractions are very difficult to separate by fractionation from other close-boiling constituents, including dimethylpentanes, normal hexane, isohexanes, benzene and methylcyclopentane.

A proposed method for effecting the recovery of high-purity cyclohexane from a naturally cyclohexane-containing petroleum fraction is by the isomerization of the cyclohexane to methylcyclopentane which can be readily separated from the cyclohexane and most other impurities such as the dimethylpentanes, isohexane, normal hexane, benzene, and the like. The thus recovered methylcyclopentane is then subsequently isomerized to high purity cyclohexane which is recovered as product. It has heretofore been shown that the isomerization of the cyclohexane to methylcyclopentane can be effected in the presence of a platinum-type catalyst, such as Penex catalyst. The isomerization of the methylcyclopentane to cyclohexane has been shown to be effected by the use of a hydrogen chloride-activated aluminum chloride catalyst. Since the aluminum chloride catalyst is a liquid catalyst which requires separation of the product from the catalyst and return of the liquid catalyst to the isomerization zone, it would be most desirable if a fixed bed catalyst system could be found for the isomerization of the methylcyclopentane to cyclohexane.

It is an object of the invention to provide a method for the isomerization of $C_6$ hydrocarbons.

In another aspect it is an object of the invention to provide an improved process for the production of high-purity cyclohexane.

In yet another object of the invention, an improved process is provided for the isomerization of methylcyclopentane to cyclohexane.

Yet another object of the invention is to provide an improved catalyst system for the isomerization of methylcyclopentane to cyclohexane.

Another object of the invention is to provide an improved process for the separation of cyclohexane from close-boiling hydrocarbons.

Yet another object of the invention is to provide an improved process for the isomerization of normal hexane to isohexanes.

These and other objects of the invention will be readily apparent to those skilled in the art from the accompanying disclosure, drawings and appended claims.

These objects are broadly accomplished for a feed containing cyclohexane and close-boiling hydrocarbons by passing the feed through a first isomerization zone containing a fixed bed isomerization catalyst wherein said cyclohexane is isomerized to methylcyclopentane, recovering methylcyclopentane from the effluent from said first isomerization zone and passing said methylcyclopentane through a second isomerization zone containing a fixed bed isomerization catalyst and maintained under conditions suitable for isomerizing said methylcyclopentane to cyclohexane and recovering high-purity cyclohexane from the effluent from said second isomerization zone.

In one embodiment of the invention said first isomerization zone comprises a first zone for the hydrogenation of benzene in the feed to cyclohexane and a second zone containing a fixed bed noble metal-alumina catalyst for the isomerization of cyclohexane to methylcyclopentane; and said second isomerization zone comprises a third zone containing a fixed bed noble metal-alumina isomerization catalyst wherein the methylcyclopentane is isomerized to cyclohexane and a fourth zone containing a hydrogenation catalyst for the hydrogenation of benzene to cyclohexane.

Figure 1:
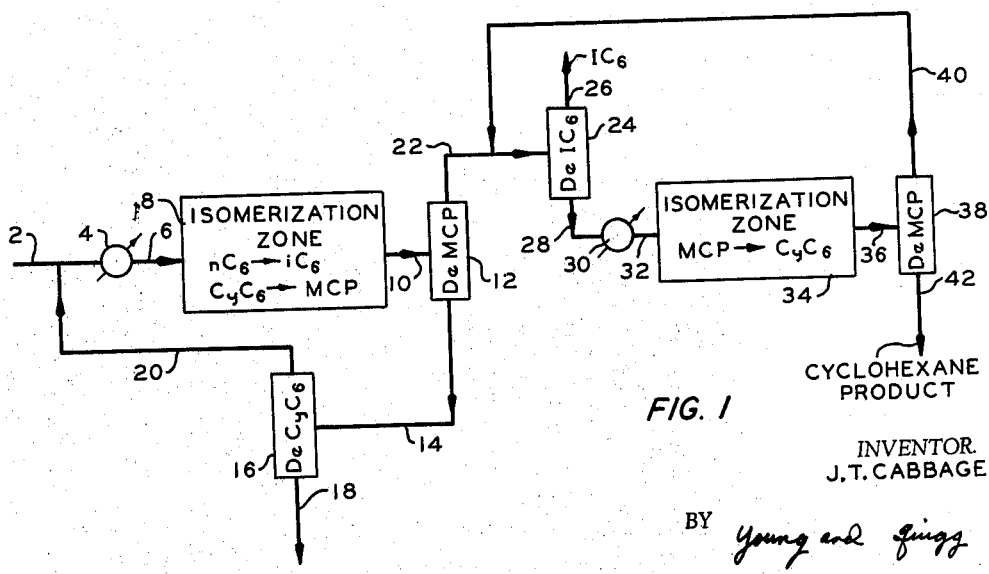

FIGURE 1 of the drawing is a schematic representation of the broad aspect of the inventive process.

FIGURE 2 of the drawing is a second schematic representation describing in detail a preferred embodiment of the isomerization zones.

Referring to FIGURE 1, a feed containing cyclohexane and close-boiling hydrocarbons such as normal hexane, isohexanes, benzene and methylcyclopentane is introduced into the system through conduit 2, heated by suitable heat exchange means 4, and passed into an isomerization zone 8 through conduit 6. In this isomerization zone the cyclohexane is isomerized to methylcyclopentane and normal hexane is isomerized to isohexanes. This isomerization is preferably effected in the presence of a platinum-type catalyst such as a Penex catalyst. Other fixed bed isomerization catalysts include those containing alumina and minor amounts of a metal of the platinum group such as ruthenium, rhodium, palladium, osmium, iridium, and platinum promoted by a minor amount of a combined halogen. Preferably, the catalyst comprises a composite of alumina and platinum with the platinum being in a concentration of from about 0.01 to about 5 percent by weight of the catalyst and more particularly a composite of aluminum, platinum and combined halogen, preferably fluorine, the platinum being in a concentration of from about 0.01 to about 3 percent and the halogen being in a concentration of from about 0.2 to about 5 percent by weight of the final catalyst. The particularly preferred catalyst comprises a composite of alumina, platinum at a concentration of from about 0.2 to about 1 percent by weight of the final catalyst. Other suitable platinum-containing catalysts comprise composites of platinum-silica, platinum-silica-alumina, platinum-silica-zirconia, platinum-silica-alumina-zirconia, platinum-silica-thoria, platinum-silica-alumina - thoria, platinum-silica-magnesia, platinum-silica-alumina-magnesia, and the like. The catalyst may be in the form of a powder or larger size granules or be irregular size and shape, but preferably is in the form of particles of uniform size and shape as obtained by pilling, extruding, the oil drop method, and the like. The conditions within the isomerization zone 8 are maintained such as to permit the isomerization of a substantial portion of the cyclohexane to methylcyclopentane.

The effluent from the isomerization zone 8 is passed through conduit 10 into a demethylcyclopentanizer 12 wherein most of the cyclohexane along with a portion of the methylcyclopentane and substantially all of the other impurities, such as the dimethylpentanes and trimethylbutane, with the exception of isohexanes and normal hexane, are removed through conduit 14 to a decyclohexanizer 16. The impurities such as 2,4-dimethylpentane in part are removed as bottoms through conduit 18. The cyclohexane and methylcyclopentane along with portions of these impurities being recycled through conduit 20 to the feed conduit 2 to the isomerization zone 8. The overhead from the demethylcyclopentanizer 12 containing a fraction concentrated in methylcyclopentane and also containing normal hexane and isohexanes is passed through conduit 22 into deisohexanizer 24. The isohexanes and lighter fraction is removed from deisohexanizer 24 through conduit 26. The bottoms from the deisohexanizer 24 is now concentrated in methylcyclopentane with a small amount of isohexanes and normal hexane carrying over and is removed through conduit 28, heated in heat exchange means 30 and passed through conduit 32 into a second isomerizaton zone 34. In this second isomerization zone, the methylcyclopentane is isomerized to cyclohexane with a fixed bed isomerization catalyst. Preferably this isomerization catalyst is of the platinum type as hereinbefore described for isomerization zone 8. Even more preferably, the catalyst is a platinum-alumina catalyst promoted with chlorine. The effluent from the isomerization zone 34 is rich in cyclohexane along with methylcyclopentane, and isohexane with a small amount of normal hexane, and is passed through conduit 36 into demethylcyclopentanizer 38. The high-purity cyclohexane (99 plus percent pure) is removed as product through conduit 42. The overhead comprising isohexanes, unconverted normal hexane, methylcyclopentane, and cyclohexane is returned to the deisohexanizer 24.

FIGURE 2 represents a detailed schematic representation of a preferred embodiment of the invention employing specific catalyst systems for the hydrogenation of benzene to cyclohexane and particular catalyst systems for the isomerization of cyclohexane to methylcyclopentane and for the isomerization of methylcyclopentane to cyclohexane.

The feed, which is as described for FIGURE 1, is passed through conduit 102, heater 104 and conduit 106 into a reactor 108. Hydrogen is introduced through conduit 134, 132, compressor 136, into feed conduit 102. Hydrogen is preferably present in a mol ratio in the range of 1:1 to 8:1. Any suitable hydrogenating catalyst may be used which will hyrdogenate the benzene to cyclohexane and thereby improve the over-all yield. Such hydrogenation system is fully described in U.S. Patent 2,906,784, issued September 29, 1959. The preferred catalyst is nickel on kieselguhr, the nickel content ranging from about 20 to about 55 weight percent of the catalyst. Preferably, the temperature is maintained within the range of 370 to 550° F. with a pressure in the range of 400 to 600 p.s.i.g. The effluent from reactor 108 is passed through conduit 110, heat exchange means 112, wherein the effluent is heated to the desired temperature for reactor 116 and through conduit 114 into reactor 116. Reactor 116 contains a fixed bed isomerization type catalyst such as hereinbefore described and preferably is platinum-alumina promoted by fluorine. The particularly preferred catalyst is a Penex catalyst. Preferably the temperature is in the range of 650 to 750° F. and the pressure is in the range of 400 to 550 p.s.i.g. and is sufficient to promote the isomerization of cyclohexane to methylcyclopentane. The effluent from reactor 116 is passed through conduit 118 and cooling means 120, conduit 122 into separator 124 wherein most of the hydrogen is removed through conduit 126 and 130 and reintroduced into the system through conduit 132. A small bleed 128 is provided so as to prevent the buildup of impurities. The methylcyclopentane-rich effluent from separator 124 is removed through conduit 138 and introduced into a stripper 140 wherein the remaining hydrogen and very light hydrocarbons are removed through conduit 142. The bottoms from stripper 140 are removed through conduit 144 and passed into a demethylcyclopentanizer 146. The bottoms from demethylcyclopentanizer 146 contain substantially all of the cyclohexane with a small amount of methylcyclopentane and other impurities which are removed through conduit 150 and passed into a decyclohexanizer 152 which is a distillation column for the removal of impurities through conduit 156 and for the recycling of cyclohexane containing small amounts of methylcyclopentane through conduit 154 back into feed 102. The overhead from demethylcyclopentanizer 146 is a methylcyclopentane-rich stream containing isohexanes and normal hexane which are removed from deisohexanizer 158 through the overhead 160. The bottoms containing methylcyclopentane is removed through conduit 162, joined with chlorine through conduit 163, and passed through heating means 164 and conduit 166 into a reactor 168. Reactor 168 is an isomerization unit for the isomerization of methylcyclopentane to cyclohexane and preferably employs a fixed bed platinum-containing catalyst such as Butamer catalyst which is a platinum-alumina catalyst promoted with chlorine. The isomerization unit is maintained under a pressure in the range of 275° F. to 375° F. and a pressure in the range of 425 to 575 p.s.i.g. and sufficient to promote the isomerization of methylcyclopentane to cyclohexane. The effluent from reactor 168 is withdrawn through conduit 170, heat exchange means 172, conduit 174 and passed into a hydrogenation reaction zone 176 containing a hydrogenation catalyst as hereinbefore described for reactor 116. The conditions are substantially identical to those of reactor 116 and are sufficient to promote the hydrogenation of benzene to cyclohexane to improve the yield and purity of cyclohexane. This reaction occurs in the presence of hydrogen introduced through conduit 194, 192, compressor 196, and into feed 162. If desired, hydrogen can also be introduced into conduit 174. The effluent from reactor 176 is concentrated in cyclohexane and is removed through conduit 178, cooler 180, conduit 182 and passed into separator 184 wherein hydrogen is removed overhead through conduit 186, 190 into conduit 192. A bleed 188 is provided for the prevention of buildup of impurities. The cyclohexane-rich stream is removed from separator 184 through conduit 198 and passed into a stripper 200 wherein the remaining hydrogen is removed overhead through conduit 202. The cyclohexane-rich stream is removed through conduit 204 and passed into a demethylcyclopentanizer 206 wherein the high purity (99+ percent) cyclohexane product is removed through conduit 210. The overhead 208 comprises substantially isohexane, methylcyclopentane and a small amount of cyclohexane.

It is considered to be within the scope of the art to provide means for heating and refluxing of the various columns and to provide conventional means for fluid transmission and process control which are not herein illustrated. It is also considered to be within the scope of the art to provide means for heating and cooling process streams. Such heating and cooling means except where herein illustrated are considered to be conventional and within the skill of the art.

By my all fixed bed catalytic system which has no catalyst-hydrocarbon separation problems, I catalytically shift the boiling points of hydrocarbon components, which were not separable by fractionation, to boiling points where fractionation can effect separation of impurities, resulting in the recovery of high purity (99.4%) cyclohexane in an efficient, relatively inexpensive manner.

The invention is best illustrated by the following example.

EXAMPLE

Reference is made to reference numerals in the drawing, FIGURE 2. A feed stream comprising essentially isohexane, normal hexane, methylcyclopentane with smaller quantities of cyclohexane, 2,4-dimethylpentane, benzene, 2,2-dimethylpentane, $C_5$'s and $C_4$'s are introduced through conduit 102 into reactor 108 at 3.5 LHSV volume/volume/hour. Reactor 108 is maintained at a pressure of 520 p.s.i.g. and a temperature of 400° F. and employs a nickel catalytic agent comprising kieselguhr with nickel present at 63 weight percent. No promoter is employed. The effluent is withdrawn at 480° F. and passed into reactor 116 containing a fixed bed Penex catalyst comprising platinum-alumina with 0.375 weight percent platinum based on catalyst with 3.0 weight percent fluorine. The reactor 116 is maintained at a pressure of 500 p.s.i.g. and a temperature of 695° F. The effluent is removed through conduit 118 at a temperature of 700° F. Hydrogen is introduced into reactor 108 through conduit 132 at a mol ratio of hydrogen to hydrocarbon of 2.5 to 1. The Penex catalyst reactor employs a 2.0 LHSV volume/volume/hour.

The purified methylcyclopentane is introduced into reactor 168 at 4.0 LHSV with a Butamer catalyst being employed comprising platinum on alumina with 0.375 weight percent platinum based on catalyst with 4.8 percent chlorine. The temperature of 300° F. and a pressure of 520 p.s.i.g. is maintained with a hydrogen circulation through conduit 192 at a mol ratio of hydrogen to hydrocarbon of 1 mol to 1 mol. The effluent is removed at a temperature of 300° F. through conduit 170 and passed into reactor 176 which contains the hydrogenation catalyst employed in reactor 116. A pressure of 500 p.s.i.g. and a temperature of 400° F. is maintained to hydrogenate the benzene to cyclohexane. The effluent is withdrawn at 420° F. and cyclohexane is subsequently recovered.

Table

| Composition Stream | Mols Per Day | | | | | |
|---|---|---|---|---|---|---|
| | 102 | 154 | 106 | 144 | 150 | 156 |
| Butanes | 236 | | 236 | 236 | | |
| Pentanes | 526 | | 526 | 526 | | |
| Isohexanes | 7,865 | 13 | 7,878 | 12,743 | 13 | |
| Normal hexane | 8,044 | 3 | 8,047 | 3,182 | 3 | |
| Methylcyclopentane | 3,637 | 790 | 4,427 | 7,909 | 791 | 1 |
| 2,2-Dimethylpentane | 107 | 28 | 135 | 28 | 28 | |
| Benzene | 1,812 | | 1,812 | 138 | | |
| 2,4-Dimethylpentane | 215 | 27 | 242 | 28 | 28 | 1 |
| Cyclohexane | 1,822 | 1,168 | 2,990 | 1,182 | 1,181 | 13 |
| 2,2,3-Trimethylbutane | | 19 | 19 | 19 | 19 | |
| 3,3-Dimethylpentane | | 4 | 4 | 32 | 32 | 28 |
| 2,3-Dimethylpentane | | | | 120 | 102 | 120 |
| 2-Methylhexane | | 1 | 1 | 79 | 79 | 78 |
| 3-Methylhexane | | | | 107 | 107 | 107 |
| 3-Ethylpentane | | | | 9 | 9 | 9 |
| Normal hexane | 64 | | 63 | 42 | 42 | 42 |
| Total | 24,327 | 2,053 | 26,380 | 26,380 | 2,452 | 399 |

| Composition Stream | Mols Per Day | | | | | | |
|---|---|---|---|---|---|---|---|
| | 148 | 208 | 148+208 | 160 | 162 | 204 | 210 |
| Butanes | 236 | | 236 | 236 | | | |
| Pentanes | 526 | | 526 | 526 | | | |
| 2,2-Dimethylbutane | 4,137 | 4,191 | 8,238 | 3,826 | 2 | 4,191 | |
| 2,3-Dimethylbutane | 1,591 | 650 | 2,241 | 2,054 | 187 | 650 | |
| 2-Methylpentane | 4,137 | 1,300 | 5,437 | 4,350 | 1,087 | 1,300 | |
| 3-Methylpentane | 2,867 | 650 | 3,515 | 1,057 | 2,458 | 650 | |
| Normal hexane | 3,179 | 434 | 3,613 | 122 | 3,491 | 434 | |
| Methylcyclopentane | 7,118 | 8,795 | 15,913 | 32 | 15,881 | 8,839 | 44 |
| Benzene | 138 | | 138 | 12 | 126 | | |
| Cyclohexane | 1 | 796 | 797 | | 797 | 7,965 | 7,169 |
| Total | 23,928 | 16,816 | 40,744 | 16,715 | 24,029 | 24,029 | 7,213 |

While certain examples, structures, compositions and process steps have been described for purposes of illustration, the invention is not limited to these. Variation and modification within the scope of the disclosure and the claims readily be effected by those skilled in the art.

I claim:

1. A process for the production of high-purity cyclohexane from a feed containing cyclohexane, dimethylpentanes, isohexanes, n-hexane and benzene in addition to other close-boiling hydrocarbons comprising passing said feed through a first isomerization zone containing a fixed bed isomerization catalyst, maintaining conditions therein suitable for isomerizing said cyclohexane to methylcyclopentane, recovering from the effluent of said first zone a first fraction concentrated in methylcyclopentane and being substantially free of said dimethylpentanes, passing said first fraction through a second isomerization zone containing a fixed bed isomerization catalyst, maintaining conditions in said second zone suitable for isomerizing said methylcyclopentane to cyclohexane, and recovering high purity cyclohexane from the effluent from said second zone.

2. The process of claim 1 wherein said second isomerization zone catalyst comprises platinum-alumina promoted by chlorine.

3. A process for the production of high-purity cyclohexane from a feed containing cyclohexane, n-hexane, isohexanes, benzene, dimethylpentanes, and methylcyclopentane comprising passing said feed through a first isomerization zone containing a fixed bed, noble metal-alumina isomerization catalyst, maintaining conditions therein suitable for isomerizing said cyclohexane to methylcyclopentane and said n-hexane to isohexanes, recovering from said first zone's effluent a first fraction concentrated in cyclohexane and a second fraction concentrated in methylcyclopentane and isohexanes and being substantially free of dimethylpentanes, recovering methylcyclopentane from said second fraction, passing said thus recovered methylcyclopentane through a second isomerization zone containing a fixed bed, noble metal-alumina isomerization catalyst, maintaining therein conditions suitable for isomerizing methyl cyclopentane to cyclohexane, recovering from the effluent from said second zone a third fraction concentrated in isohexanes, methylcyclopentane and cyclohexane, and recovering high-purity cyclohexane from said third fraction.

4. The process of claim 3 wherein said first fraction is recycled to said first isomerization zone.

5. The process of claim 3 wherein said first isomerization zone catalyst comprises platinum-alumina promoted with fluorine.

6. The process of claim 3 wherein said second isomerization zone catalyst comprises platinum-alumina promoted with chlorine.

References Cited by the Examiner

UNITED STATES PATENTS

| | | | |
|---|---|---|---|
| 2,382,446 | 8/1945 | Ross | 260—666 |
| 2,766,302 | 10/1956 | Elkins | 260—666 |
| 2,821,561 | 1/1958 | Pevere | 260—667 X |
| 3,009,002 | 11/1961 | Kron | 260—666 X |
| 3,112,351 | 11/1963 | Hoekstra | 260—666 X |

DELBERT E. GANTZ, *Primary Examiner.*

LEONARD FORMAN, *Examiner.*

V. O'KEEFE, *Assistant Examiner.*